United States Patent
Lewis et al.

[11] Patent Number: 6,151,913
[45] Date of Patent: Nov. 28, 2000

[54] METHOD AND APPARATUS FOR AGGLOMERATING FINE SNOW PARTICLES

[75] Inventors: Timothy Michael Lewis, Spokane, Wash.; Theodore Hall Gasteyer, III, Naperville; Terry Traeder, Aurora, both of Ill.

[73] Assignee: Praxair Technology, Inc., Danbury, Conn.

[21] Appl. No.: 09/298,526

[22] Filed: Apr. 23, 1999

[51] Int. Cl.[7] ........................................ F25J 1/00
[52] U.S. Cl. ............................... 62/603; 62/384
[58] Field of Search ........................ 62/603, 384

[56] References Cited

U.S. PATENT DOCUMENTS

| | | | |
|---|---|---|---|
| 1,972,240 | 9/1934 | Rufener et al. | 62/603 |
| 3,667,242 | 6/1972 | Kilburn | 62/10 |
| 3,786,644 | 1/1974 | Rich et al. | 62/603 |
| 3,932,155 | 1/1976 | Pietrucha et al. | 62/10 |
| 4,111,362 | 9/1978 | Carter, Jr. | 239/1 |
| 4,287,719 | 9/1981 | Students | 62/10 |
| 4,372,130 | 2/1983 | Klee et al. | 62/330 |
| 4,376,511 | 3/1983 | Franklin, Jr. | 239/14 |
| 4,415,346 | 11/1983 | Love | 62/603 |
| 4,444,023 | 4/1984 | Barbini et al. | 62/330 |
| 4,462,423 | 7/1984 | Franklin, Jr. | 137/561 |
| 4,640,460 | 2/1987 | Franklin, Jr. | 239/2.2 |
| 4,652,287 | 3/1987 | Allen et al. | 62/35 |
| 5,566,553 | 10/1996 | Gibot et al. | 62/603 |
| 5,765,394 | 6/1998 | Rhoades | 62/603 |
| 5,868,003 | 2/1999 | Simas et al. | 62/603 |
| 6,023,941 | 2/2000 | Rhoades | 62/603 |

*Primary Examiner*—Ronald Capossela
*Attorney, Agent, or Firm*—Donald T. Black

[57] ABSTRACT

The device forms snow from pressurized carbon dioxide fluids. A supply conduit delivers a flow of pressurized fluid. An expansion member attached to the supply conduit contains a plurality of channels for reducing pressure on the fluid and converting the fluid with reduced pressure into a mixed-phase stream of gas and fine snow particles. The channels have an average diameter and an average length of at least twice its average diameter. An agglomeration chamber attached to the plurality of channels agglomerates the fine snow particles by contacting the fine snow particles together.

18 Claims, 4 Drawing Sheets

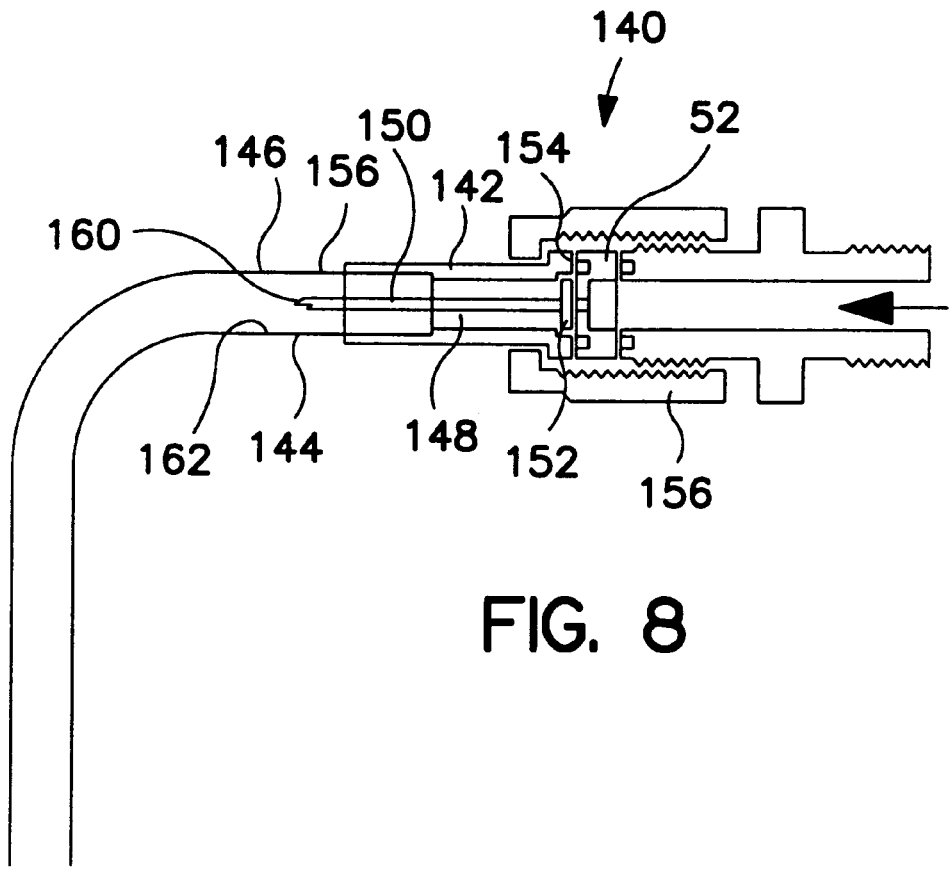
FIG. 8
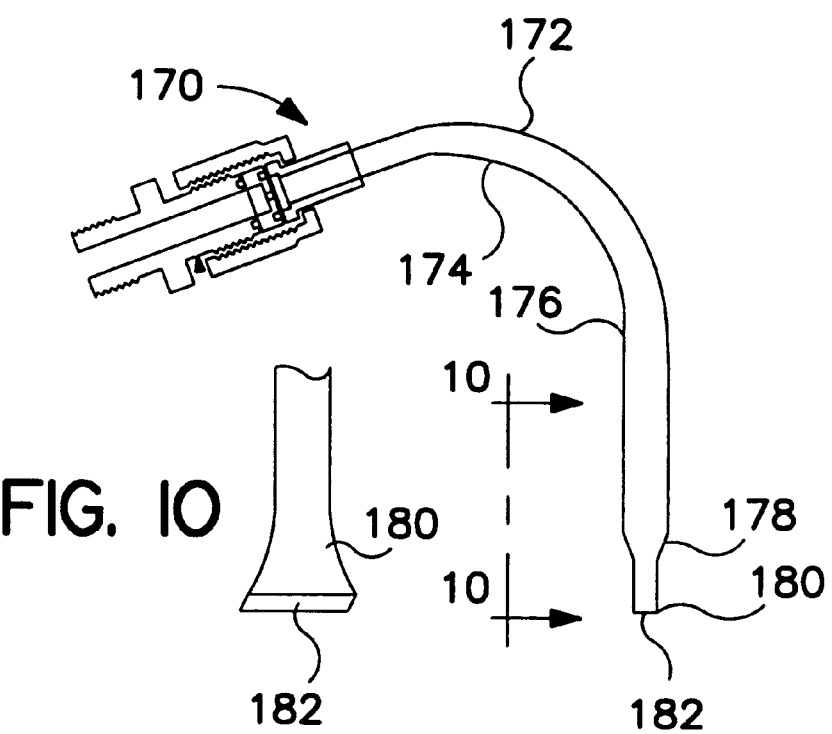
FIG. 10
FIG. 9

METHOD AND APPARATUS FOR AGGLOMERATING FINE SNOW PARTICLES

FIELD OF THE INVENTION

This invention relates to a method and apparatus for producing cryogenic snow particles. Particularly, it is related to an improved method and nozzle structure for converting a flow of carbon dioxide fluid into a flow of vapor and fine snow particles, and then further agglomerating the fine snow particles into larger flakes.

BACKGROUND OF THE INVENTION

Snow particles produced from carbon dioxide are widely used in the production of frozen foods. Large bulk storage of carbon dioxide liquid is made possible by maintaining the carbon dioxide gas under proper pressure and temperature for refrigeration conditions. If storage tanks are maintained at 0° Fahrenheit (−18°C.), with a pressure of approximately 300 lbs. per square inch (2 MPa), the carbon dioxide is in the form of a liquid. At the point of use, the liquid carbon dioxide is converted to a mixture of fine carbon dioxide snow and vapor by rapid expansion thereof through a multitude of small orifices.

Prior art apparatus for the production of carbon dioxide snow-making employ relatively simple orifices to enable an expansion to occur of the carbon dioxide liquid feed. However, typically, prior art expansion devices or nozzles such as snow horns and orifices, create a spot impingement pattern. These are loud, and are bulky and difficult to fit into small spaces. The high velocity of the carbon dioxide snow also creates difficulty in applying an even snow blanket and can damage fragile items, such as cheese toppings on pizza or whipped toppings on bakery items.

U.S. Pat. No. 3,667,242 to Kilburn describes a structure for producing carbon dioxide snow where liquid carbon dioxide flows into an upper portion of a hollow, double-side-walled cylindrical horn. This horn has an open bottom and a closed top. A nozzle in the upper-most portion of the cylindrical horn imparts a swirling tangential movement to the snow formed in the horn.

U.S. Pat. No. 4,111,362 to Carter, Jr. describes a carbon dioxide snow making nozzle arrangement. Pairs of carbon dioxide transverse jets inject carbon dioxide into a horn region. The expanding jet mixtures of snow and vapor collide to dissipate the energy of the jets.

U.S. Pat. No. 4,287,719 uses a curved rectangular tube (J Horn) to inject vapor and a solid mixture radially along two cylinders' walls positioned at the J horn exit. The positioning injects half of the flow of $CO_2$ along a wall of one cylinder and injects the other half along a wall of the other cylinder. This injection forms two counter rotating currents of $CO_2$ snow. These currents fall vertically down and mix together to form large-low velocity snow.

U.S. Pat. No. 4,376,511 to Franklin, Jr. describes a carbon dioxide snow forming device wherein a manifold is positioned within a channel member and carbon dioxide snow dispenses towards the sides of the channel member. This dissipates some of the snow's kinetic energy.

U.S. Pat. No. 4,462,423 to Franklin, Jr. describes a carbon dioxide snow-forming header. Nozzles positioned along the header enable multiple regions to dispense carbon dioxide snow.

U.S. Pat. No. 4,640,460 to Franklin, Jr., describes a carbon dioxide snow-forming header containing a pair of nozzles. A supply of liquid carbon dioxide feeds inlet ends of the nozzles. In addition, applying liquid carbon dioxide to the inlet ends of the nozzle chills the supply line to reduce the temperature of the liquid carbon dioxide being supplied to the triple-point.

Attempts have been made to overcome the problems of previous agglomeration methods and designs. But, there is little prior art on the subject of fine snow agglomeration or a method of fine snow agglomeration.

For instance, U.S. Pat. No. 5,868,003 to Simas et al. describes an apparatus for producing fine snow particles in the range from 0.2 to 300 microns. This apparatus is coupled to various agglomerating devices either directly or through an intermediate pressure expansion. This device produces a stream of fine-high velocity flakes. These flakes sublimate upon contact with room temperature food objects. This technology is highly effective for rapid freezing of objects. Unfortunately, the high velocity presents problems with delicate and low-density foods. Furthermore, food suppliers desire to chill but not freeze several foods such as fresh fish. The fine flakes produced by this technology freeze the food before it can build up as a protective coating.

There is a need for an improved snow dispensing apparatus and a method that produces a highly agglomerated snow. Furthermore, such devices should produce snow particles of relatively constant particle dimensions so as to ensure even application of the particles across food or other products being cooled.

Snow dispensing nozzle apparatus can have problems with snow particles clogging the nozzles or discharge tubes. Further, the nozzles have required nearly vertical orientation relative to the surface or product to be snowed. They have also required relatively large horn discharging devices, which are not suitable for applications in physically limited spaces and for discharges into very local areas.

Fine snow dispensing nozzles have had limited application since their high velocity stream of fine particles of, for example, about 10 to 300 microns, has not been useful for some snowing applications. The fine snow particles tend to sublimate immediately on landing and do not build up on product. A jet of this fine snow that enters normal room temperature air will sublimate almost immediately as it expands away from the nozzle due to the mixing of warm air with the fine snow. Also, the high velocity flow of fine particles tends to prevent them from adhering to certain surfaces. Agglomeration devices have typically contained injectors and horns that try to uniformly expand and slow the solid vapor mixture. These types of devices do not provide for sufficient agglomeration of fine snow. Typical horns try to avoid sudden expansions and contractions in areas. This leads to plugging problems due to flow recirculation.

Accordingly, it is an object of this invention to provide improved snow dispensing nozzle apparatus that can agglomerate snow particles and provide larger snowflakes.

It is a further object of this invention to provide improved snow dispensing nozzles that can modify snow particle size, velocity and snow pattern.

It is a further object of this invention to provide an improved snow dispensing nozzle that is quiet, small, of simple design, and operates in all orientations.

It is a further object of this invention to provide an improved structure for holding an expansion member and mounting it to snow dispensing nozzles.

It is a further object of this invention to provide an improved method of agglomerating fine snow particles into larger more useful size particles.

SUMMARY OF THE INVENTION

The device forms snow from pressurized carbon dioxide fluids. A supply conduit delivers a flow of pressurized fluid. An expansion member attached to the supply conduit contains a plurality of channels for reducing pressure on the fluid and converting the fluid with reduced pressure into a mixed-phase stream of gas and fine snow particles. The channels have an average diameter and an average length of at least twice its average diameter. An agglomeration chamber attached to the plurality of channels agglomerates the fine snow particles by contacting the fine snow particles together.

The method produces large snowflakes from pressurized carbon dioxide. It first provides a supply of pressurized fluid and then sends the pressurized fluid to a low pressure chamber through a plurality of channels. The expansion of the pressurized fluid creates a mixture of fine snow particles and gas. The plurality of channels have an average diameter and an average length of at least twice its average diameter. Finally, agglomerating the fine snow particles into the snowflakes forms a product suitable for multiple chilling applications.

BRIEF DESCRIPTION OF THE DRAWINGS

FIG. 8 is a vertical sectional view of a nozzle apparatus that includes an intermediate pressure chamber.

FIG. 9 is a vertical sectional view of a nozzle apparatus that incorporates a slot-shaped nozzle.

FIG. 10 is a side elevational view of a portion of the duct means shown in FIG. 9, as would be seen along line 10—10.

DETAILED DESCRIPTION OF THE INVENTION

The device and method convert a fine stream of a snow subject to sublimation into useful agglomerated snowflakes. The fine stream forms from a controlled expansion of a cryogenic fluid through a channel. The preferred cryogenic fluid is carbon dioxide. However, it is to be understood that the invention is equally applicable to other cryogenic fluids that expand through channels to create a finely dispersed cryogen pattern.

Figure 1:
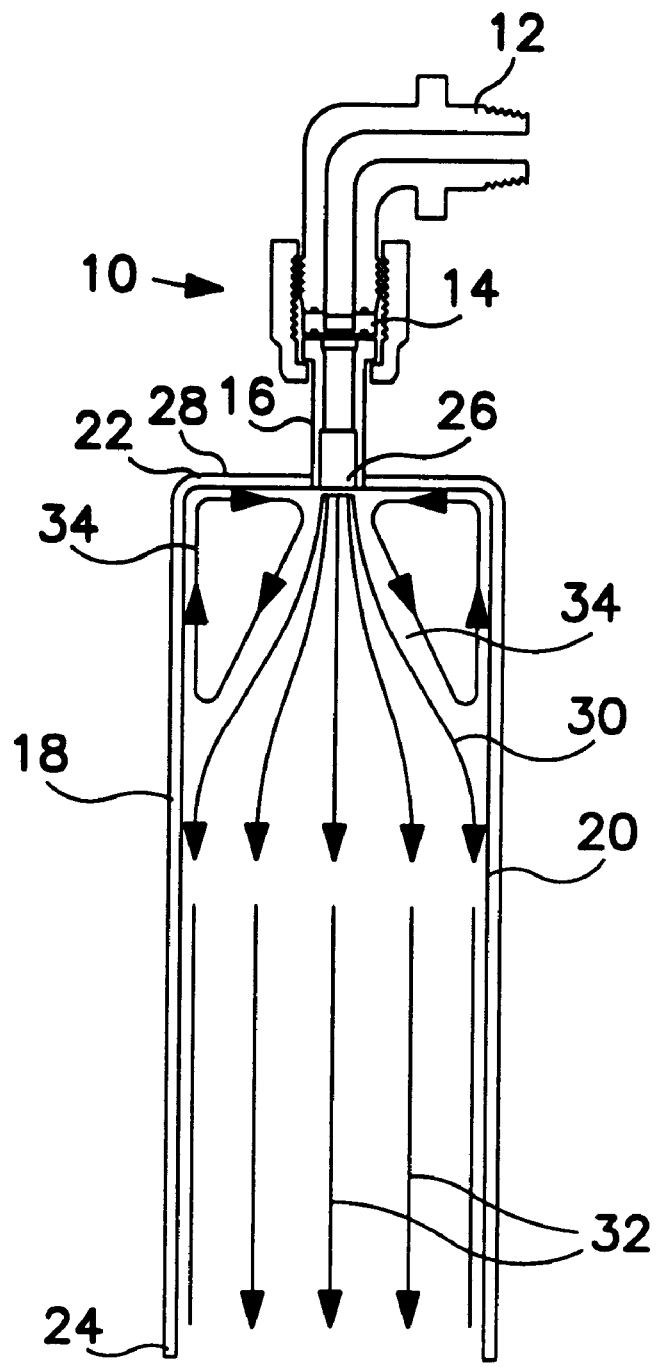
FIG. 1 is a vertical sectional view of a snow making apparatus with an attached cylindrical horn showing its solid/vapor flow patterns.

Referring to FIG. 1, pressurized gas, such as liquid carbon dioxide enters a supply conduit 12. The pressurized gas travels through channels 14 to produce a stream of fine snow particles. Advantageously, the cryogenic fluid enters the channels as a liquid and exits the channels as a mixture of snow and gas. Most advantageously, the liquid enters the channels under saturation conditions. The channels have an average length of at least twice their average diameter. This length to diameter relationship provides a gradual pressure drop and a useful stream of fine-collimated snow. If the average length is at least five times its average diameter, then the device forms a collimated stream of snow without a disruptive pressure drop. The duct means 16 connects directly to a cylindrically-shaped snow horn 18 to provide a bore 20 with a continuous smooth surface from its entrance 22 to the horn's exit 24. Duct means 16 communicates with and connects to the horn 18 through a sharp, discontinuous expansion in an area determined by an entrance hole 26 in top plate 28 that is concentrically located on the snow horn 18.

The snow horn 18 acts as a nozzle that slows and mixes the flow of carbon dioxide snow particles and vapors and causes the snow particles to agglomerate. The mismatch in the area of the injected flow through a duct means 16 with the area in the snow horn 18 creates circulation patterns at the entrance 22. Diverging velocity vectors 30 in the entrance region of the horn 18 show how the flow of solid and vapor diverge from the jet exiting the duct means to the outer wall of the horn. Uniform velocity vectors 32 in the exit region of the horn 18 show how the flow of agglomerated solid and vapor exit the horn 18. A recirculation zone 34 allows for the divergence and slowing of the snow's flow. This enhances the agglomeration of the fine solid particles into larger flakes. Thus, the gas/solid mixture's stream speed at the horn exit 24 is relatively uniform and slow, the particle size is large, and the spray pattern of snow roughly equals the exit diameter of horn 18. This is suitable for gently dispensing relatively large snow flakes on fragile products or on a belt or other material that needs to be cooled. If the horn 18 has a diameter of at least three times the diameter of the supply conduit 12, it effectively forms large snowflakes that do not immediately sublimate upon contact with room temperature objects.

Figure 2:
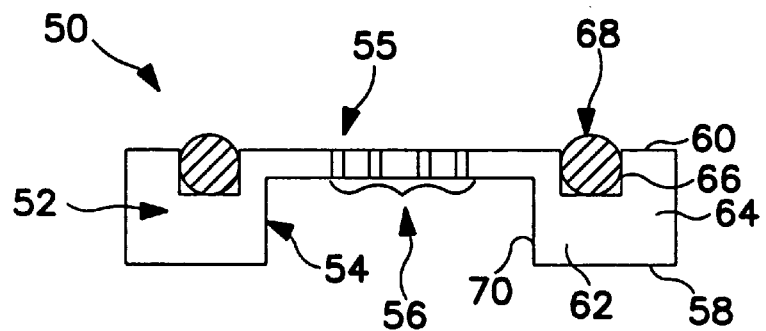
FIG. 2 is a vertical sectional view of an expansion member assembly holding a multiple channel insert.

Referring to FIG. 2, an expansion member assembly 50 includes an expansion member holder 52. The holder 52 has a cavity 54 therein, and an expansion member 56 that consists of a plurality of fine channels 55 that cut through the expansion member holder in the cavity. The body of holder 52 has opposed major surfaces, a lower surface 58 and an upper surface 60, a central portion 62 and a peripheral portion 64. The peripheral portion 64 of the surface 60 has an annular groove 66 therein and a sealant member or an O-ring 68, seated in the groove. The lower and upper surfaces 58 and 60 of the holder 52 respectively contain lower hole and multiple fine channels 70, 55. These communicate with the cavity 54. The multiple fine channels 55 have diameters that are much smaller than that of the cavity 54. The hole 70 and channels 55 are adapted, that is, structurally sized and located, to expose multiple fine channels 55. This allows liquid carbon dioxide to pass through lower hole 70, and a mixture of carbon dioxide snow and vapors to exit channels 55.

Figure 3:
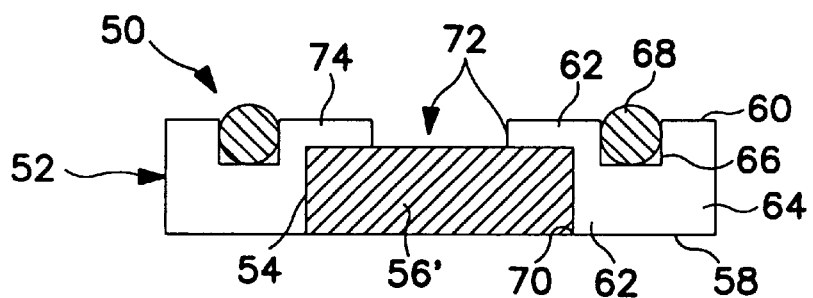
FIG. 3 is a vertical sectional view of an expansion member assembly holding a porous channel insert.

FIG. 3 shows an expansion member holder 52 having a cavity 54 therein and an expansion member 56 seated in the cavity. An expansion member 56' consists of a porous member, disc or insert. The body of holder 52 has opposed major surfaces, a lower surface 58 and an upper surface 60, a central portion 62 and a peripheral portion 64. The peripheral portion 64 of the surface 60 has an annular groove 66 therein and a sealant member or an O-ring 68 seated in the groove. The lower and upper surfaces 58 and 60 of the holder 52 have lower and upper holes 70 and 72. These communicate with the cavity 54. The upper hole 72 has a diameter that is smaller than that of cavity 54 so that the central portion 62 of the holder 52 has a lip 74 adjacent the upper hole 72. This overlies and in part defines the cavity 54. The lip 74 prevents the expansion member 56' from extending through the upper hole 72. The holes 70 and 72 expose multiple fine channels (not shown) in porous expansion member 56. This allows liquid carbon dioxide to pass through lower hole 70, and carbon dioxide snow and vapors to exit its upper hole 72.

Figure 4:
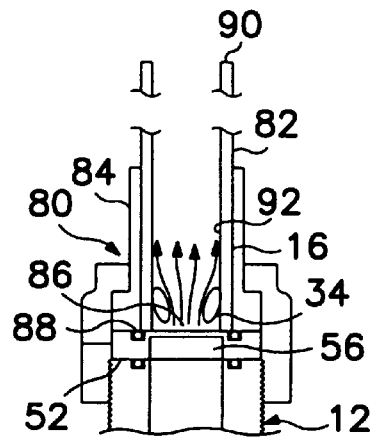
FIG. 4 is a vertical sectional view of a nozzle apparatus, with portions broken away, showing solid/vapor flow patterns.

FIG. 4 shows a nozzle apparatus 80 that includes an axially elongated tubular member 82 telescoped axially within a collar 84. A tubular member 82 has an entrance 86, an entrance end face 88, an exit 90, and a bore 92 that extends between its entrance 86 and exit 90. The outer surface of the tubular member 82 frictionally engages with bore 92 of collar 84 to prevent relative axial movement between the tubular member 82 and collar 84. Thus, as the retaining ring mounts compress, they seal entrance end face of collar 84 tightly against the holder 52.

This drawing illustrates that injecting fine solid and vaporous carbon dioxide through a small area into a larger duct means 16 creates the snow recirculation zone 34. The bore of duct means 16 has a continuous smooth surface to prevent accumulation of snow particles. Thus, for example, the bore 92 of the tubular member 82 advantageously has a continuous smooth surface from its entrance to its exit. By mounting the entrance end face of the tubular member directly against the upper surface of the holder 52, the carbon dioxide snow particles emitted from the expansion member 56 have no irregularity or protrusion that could cause uncontrolled accumulation of snow particles and consequent clogging.

The duct means need not be a one-piece unit from entrance to exit. Thus, the duct means can include individual sections that join together through a smooth surface or transition. The exit of the duct means may include a snow horn or other device positioned at the terminal end of the duct means to control or direct the flow of snow particles from the duct means.

Figure 5:
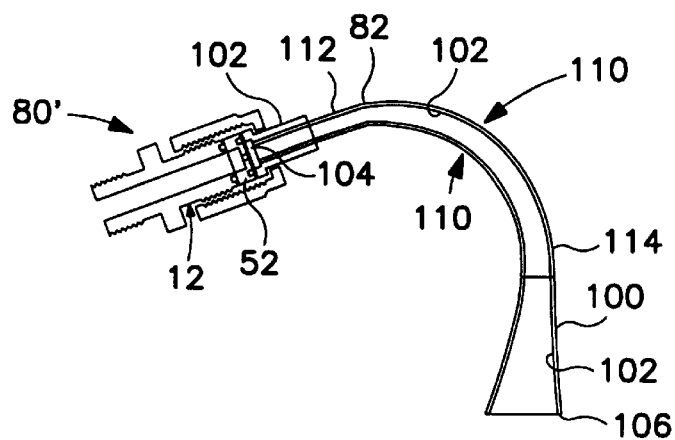
FIG. 5 is a vertical sectional view of a nozzle apparatus incorporating a bent tube and a snow horn.

Referring to FIG. 5, an optional nozzle apparatus 80' has a tubular member 82 connected through a straight surface transition to a conically-shaped discharge horn 100 to provide a bore 102 with a continuous smooth surface from its entrance 104 to its exit 106. The tubular member 82 has a curved portion 110 to increase agglomeration of carbon dioxide snow particles as they pass through a bore section 102 of a curved portion 110. A tubular member 82 also has a straight entrance portion 112 upstream of and that communicates with the curved portion 110. The curved portion 110 also includes or communicates with a downwardly aimed tubular portion 114 that connects through a smooth transition to an axially aligned horn 100. The wall of horn 100 flares to provide appropriate diffusion of flow. The conical horn 100 acts as a diverging nozzle that diverges and slows the flow of carbon dioxide snow particles and vapors and causes the snow particles to agglomerate. Thus, the flow stream speed is relatively slow, the particle size is large, and the spray pattern of snow is slightly wider than the exit diameter of the horn 100. This is suitable for gently dispensing relatively larger carbon dioxide snow flakes on fragile products or on a belt or other material that needs to be cooled.

The length of the horn 100 determines the flow capacity of expansion member 56. If a high flow nozzle is desired, a longer horn slows the flow sufficiently and agglomerates the carbon dioxide snow particles. If the length of the horn remains constant and the pressurized gas enters with a lower flow rate, the amount of carbon dioxide snow particles and vapor in the flow stream may not be sufficient and air will be able to infiltrate into the inside of horn 100. This air entrainment can be detrimental because the air's humidity will freeze and build up on the inner surface of horn 100 to obstruct the flow of snow particles.

Figure 6:
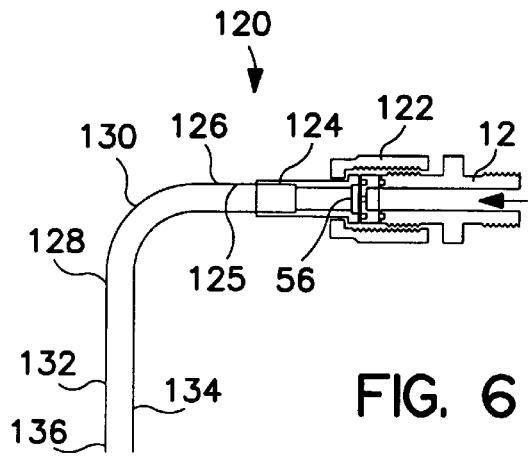
FIG. 6 is a vertical sectional view of another embodiment of a nozzle apparatus incorporating a bent tube.

Referring to FIG. 6, a preferred nozzle apparatus 120 has a collar 122 with a radially outward step 124 to provide a larger diameter bore 125 that axially accepts and frictionally engages a straight entrance portion 126 of a tubular member 128 to provide a continuous smooth bore surface through the junction or interface of the collar 122 and tubular member 128. The tubular member 128 has a curved portion 130 that extends through an angle of about 90 degrees to agglomerate the carbon dioxide snow particles. A straight exit portion 132, downstream of the curved portion 130, provides a tightly collimated flow stream of agglomerated carbon dioxide snow particles through the exit portion 134 and its exit 136. The tubular member 128 optionally flares at its exit 136 to prevent snow from building up. For high velocity discharge of flakes, the tubular member 128 and exit 136 have equal cross sectional areas.

Figure 7:
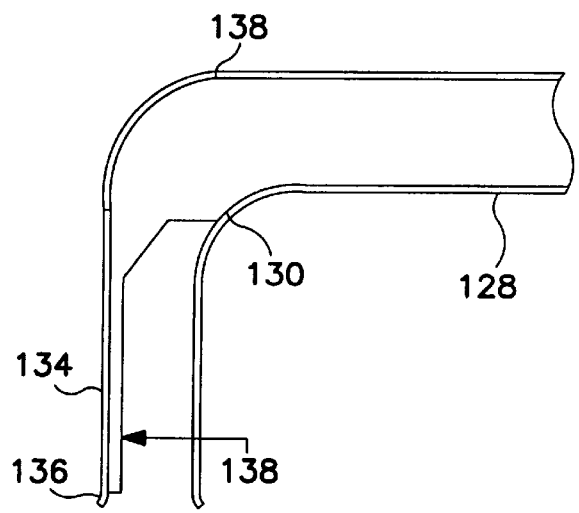
FIG. 7 is a vertical sectional view, with portions broken away, showing the flow pattern of solid and vaporous carbon dioxide through the bent tube of FIG. 6.

Referring to FIG. 7, the tubular member 128 contains the flow of fine carbon dioxide snow particles and vapor emitted from its expansion member 56 (See FIG. 6). Typically for liquid carbon dioxide expanded to atmospheric conditions, the mixture exits in a 40/60 snow/gas weight percent ratio. This mixture fills the straight entrance portion 126 of the tubular member 128. As the mixed stream passes through the curved portion 130, the higher density of the solid particles or flakes causes them to move towards the outer surface of the bore 125 of the tubular member 128. The snow particles thus flow close to and along that surface such that the particles rub together and agglomerate into larger flakes. Unlike snow formed from conventional nozzles, this snow has a high surface area and flows as a mixture with the vapor phase—conventional nozzles form snows having lower surface areas that move independently of the vapor phase and tend to agglomerate. This unique flow characteristic of high surface area snows appears to allow the mixture to flow around bends. Accordingly, the flow stream passing through the straight exit portion 134 downstream of the curved portion 130 with a higher fraction of agglomerated snow flakes 138. The straight exit portion 134 distributes the flow and provides a tightly collimated exit flow stream of agglomerated-large flakes.

Referring to FIG. 8, a nozzle apparatus 140 has a stepped conduit 142 and axially accepts and engages a tubular member 144. The duct means 146 includes an intermediate pressure tube or member 148. The interior of the intermediate pressure tube 148 forms an intermediate pressure chamber 150. The intermediate pressure tube 148 axially mounts within and preferably frictionally engages the tubular member 144. The entrance end of the intermediate pressure member 148 has an outwardly extending flange 152 and an entrance end face 154 that mounts by compressing the retaining ring 156 tightly against the holder 52. The intermediate pressure member 148 extends through a portion of a straight entrance portion 158 of the tubular member 144. It has an angular slot 160 at an end that directs a stream of snow particles and vapor against the adjacent lower surface of a tubular member bore 162. Preferably, the slot 160 has a minimum length equivalent to at least about two or three times the diameter of bore 162 upstream from the start of curved portion 160. The intermediate pressure member 148 creates a recirculating flow inside of the tubular member 144 that enhances the agglomeration effect. The larger diameter of the tubular member 144 (compared to the intermediate pressure member 148) slows the velocity of flow of vapor/snow particles and enables an additional agglomeration of the carbon dioxide snow particles as they move through the tubular member 144.

FIGS. 9 and 10 illustrate another embodiment where a nozzle 170 contains a tubular member 172 and a curved portion 174. The curved portion 174 extends through an angle of less than 90 degrees to agglomerate snow particles. The agglomerated snow exits through a straight portion 176 that has a reduced diameter portion 178 and a flared exit 180. As shown in FIG. 10, and as would be seen in cross section (not shown), the flared exit 180 has an elongated, narrow rectangular slot 182 that preferably has rounded corners. The flared exit 180 has a smaller cross sectional area than the cross sectional area of the upstream normal diameter of the tubular member 172. This and the slot shape of the flared exit 180 accelerate the flow and reduce the size of the agglomerated snow particles as they flow through the slot 182. This provides a wide, flat exit flow stream having a higher velocity and smaller particle size than the stream of the nozzle apparatus. The flow stream provided by nozzle apparatus 170 is appropriate for effecting high heat transfer from an exposed product. An embodiment of nozzle apparatus 170 that provided such a flow stream had a tubular member 172 with a bore internal diameter of about 0.465 inch (1.18 cm), and a slot-shaped exit 182 having an internal slot width of about 0.075 inch (0.19 cm)and an internal slot length of about 0.75 inch (1.9 cm).

When employing duct means having a flared, slot-shaped narrow exit 180 as in FIGS. 9 and 10, the flow rate, bore diameter and geometry of the duct means, e.g. the tubular member 172, and the amount of agglomeration and the particle size in the exit portion 178 must match the area of the slot-shaped exit. This allows the stream of snow particles to flow properly through the exit 180 without accumulation or clogging. For example, whereas an expansion member having a flow rate of 2.4 lb/min. (1.09 Kg/min.) employed with a tubular member 172 and a 0.075 inch (0.19 cm) by 0.75 inch (1.9 cm) slot-shaped exit area performed without any trouble, an expansion member having a lower flow rate of 1 lb/min. (0.453 Kg./min.) employed in the same apparatus, caused increased agglomeration and larger particle sizes in exit portion 178 that accumulated in and clogged exit 180. Thus, as the flow rate decreases, the diameter and geometry of duct means and the tip gap must be adjusted to reduce agglomeration or increase the exit area to allow the larger particles to flow through the exit.

The expansion member holder can be made of any suitable material such as brass, stainless steel, aluminum or another relatively non-corrodeable material. The preferred material is stainless steel. For the design illustrated in FIG. 2, the holder 52 is machined such that its cavity 54 has a diameter that is smaller, e.g., by about 0.001 to about 0.002 inch (0.002 to 0.005 cm), than that of the expansion member. This is so that it seats and holds the expansion member in the cavity with an interference fit. Thus, it avoids the use of adherents that could foul fine channels of the expansion member. The expansion member is pressed deep into the cavity 54 to seal tightly against the lip of the holder between the expansion member and lip. This avoids snow particle blow-by between the expansion member and lip, which can cause irregular flow rates and patterns to be emitted from the expansion member. The size and shape of the upper hole in the holder determine the flow area and spray pattern of the solid and vaporous carbon dioxide emitted from the expansion member. Reducing the diameter of the upper hole reduces the flow area and flow capacity of the expansion member.

The nozzle apparatus facilitates a continuous smooth flow stream of carbon dioxide snow particles from their inception through their exit from the apparatus. A continuous smooth bore surface advantageously does not have surface irregularities, e.g. weld slag, or gaps, or protrusions such as protruding edges at joints or interfaces, which could provide a site for or cause accumulation of snow particles, clogging of the apparatus. The duct means can include the portion of the internal pathway of the nozzle that is downstream of an expansion member. This is operational within its internal pathway. The continuous smooth surface extends from the expansion member, preferably from the holder to the exit of the duct means. The duct means can be non-circular in cross section.

The nozzle apparatus produces carbon dioxide snow particles by forcing pressurized carbon dioxide fluid through a porous expansion member having fine channels therethrough of about the 0.2 to 500 micron range. Most advantageously, the channels have an average diameter of about 50 to 500 microns. The nozzle apparatus includes structure to alter the snow particle size, velocity or flow pattern to suit a broad range of applications. For example, the nozzle apparatus can provide larger particle sizes through the use of duct means having a curved portion to agglomerate the fine snow particles emitted from the expansion member as they pass through the curved portion. The amount of curvature can extend through any suitable angle, including from less than 90 degrees to about 250 degrees. Preferably the curvature is through an angle of at least about 90 degrees. For example, FIG. 5, shows duct means in the form of a tubular member whose curved portion is greater than 90 degrees and FIGS. 6 through 8, about 90 degrees. The curvature of the conduit achieves the desired amount of agglomeration and the desired particle size. Advantageously, these flakes have an average maximum dimension of at least about 0.5 mm. Most advantageously, the flakes have an average maximum dimension of at least 5 mm.

An intermediate pressure tube or member, preferably in the entrance portion of the duct means also achieves large flakes. Although the pressure of the solid and vaporous carbon dioxide flow stream in an intermediate pressure member can range from the triple point pressure to zero psig (0 Pa), the preferred pressure there is less than 5 psig (34 KPa). The pressure in the intermediate pressure member is adjusted by sizing the opening of the slot to be wide enough for the flow rate. The flow out of the slot is a wedge-shaped jet that impinges on the surface of the bore of the tubular member. The radius of the tubular member and the shape of the jet form a swirling flow pattern inside the bore. This causes the snow particles of the flow stream to engage one another and agglomerate. Although any orientation of an intermediate pressure member will perform satisfactorily, FIG. 8 shows the preferred orientation where the downward angle of the slot 160 is in the same plane as the curvature of tubular member 144.

Larger particle sizes can also be obtained by the duct means that includes devices such as a snow horn that diverges and slows the stream of snow and agglomerates the carbon dioxide snow particles in the stream.

It has been found that nozzles that employ a porous expansion member having a rating from about 10 to about 40 microns, or multiple fine channels with diameters of 50 to about 300 microns with the nozzle apparatus of FIGS. 6 to 8 are preferred for providing agglomeration and larger particle sizes suitable for box snowing applications or for other localized spot snowing needs.

It has also been found that for nozzle apparatus that employ an expansion member having a larger micron rating of from about 40 to about 100 microns, duct means without an intermediate pressure member, such as shown in FIGS. 1, 6 and 7, provide sufficiently agglomerated and sufficiently large particle sizes for box snowing applications or for other localized spot snowing needs.

It has been found that for nozzle apparatus that employ an expansion member having a rating from about 10 to about 40 microns, or multiple fine channels with diameters of 50 to about 300 microns, duct means that are attached to either conical or cylindrical horns, such as nozzle apparatus of FIG. 1, are preferred for providing agglomeration and larger particle sizes suitable for belt snowing or other area snowing applications.

The velocity of the snow particles exiting from the duct means can be modified, for example, by employing a horn such that diverges flow and reduces the velocity of flow from the exit, or by employing a smaller diameter flared, slot-shaped exit, such as shown in FIGS. 9 and 10. This reduces agglomeration and accelerates flow through its exit. The velocity can also be modified by selection of the flow capacity of the expansion member or by increasing the number and diameter of the fine channels in the expansion member, or by modifying the size of the upper hole of the expansion member holder.

The mass flow rate affects the amount of agglomeration achieved through the device and the effective diameter, D2, of the tube or horn attached to the stream of solid and vapor coming out of the expansion member at effective diameter D1. As ratio D2/D1 approaches infinity, the amount of agglomeration approaches zero. This is the same as injecting directly into air with no horn. As ratio D2/D1 approaches 1 there is again very little agglomeration. This is similar to injecting into an intermediate pressure tube. There is very high velocity and very little agglomeration. Preferably, the ratio D2/D1 should be between about 1.5 and 10 to achieve good agglomeration.

As the mass flow through the system increases, the amount of agglomeration in the system decreases. This is a velocity effect. For area snowing applications, it has been found that diameter ratios between about 2.25 to 10 with respective vapor velocities between about 800 to 35 feet per minute (240 to 11 meters per minute) achieve good agglomeration. For spot snowing applications using bent tubes, it has been found that diameter ratios between about 1.5 to 2.25 with respective vapor velocities between about 3500 to 800 feet per minute (1070 to 240 meters per minute) achieves good agglomeration. The pattern of flow exiting the duct means can be further modified, for example, by use of a duct means such as a tubular member having a straight exit portion as in FIGS. 6 to 8 to provide a tightly collimated stream, by use of a horn such as in FIG. 1 to diverge the flow, or by use of a flared slot-shaped exit such as in FIGS. 9 and 10 to provide a flattened flow pattern.

The nozzle apparatus of the invention are advantageous for the additional reasons that they are small, quiet and can be employed in any desired orientation. The snow dispensing nozzle can agglomerate fine snow particles and modify snow particle size, velocity and snow pattern. Furthermore, this nozzle operates in all orientations. In addition, it provides an improved structure for holding an expansion member and mounting it to snow dispensing nozzles. Finally, it provides an improved method of agglomerating fine snow particles into larger more useful size particles that do not immediately sublimate upon contact with room temperature objects. This is useful for both chilling and freezing food items.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A device for forming snow from pressurized fluids comprising:

a supply conduit for delivering a flow of pressurized fluid, an expansion member attached across the supply conduit, the expansion member containing a plurality of channels for reducing pressure on the fluid for converting the fluid with reduced pressure into a mixed-phase stream of gas and fine snow particles, the plurality of channels having an average diameter and an average length of at least twice its average diameter, and an agglomeration chamber attached to the end of the supply conduit for agglomerating the fine snow particles by contacting the fine snow particles together, wherein the agglomeration chamber consists of (i) a cylindrically shaped snow horn for discharging agglomerated snow particles, said snow horn having a diameter of at least three times the diameter of the supply conduit, or (ii) a curved tubular member for directing the fine snow particles against a surface of the curved tubular member for the agglomerating of the fine snow particles, the tubular member having an open end.

2. The device of claim 1 wherein the agglomeration chamber consists of a curved tubular member for directing the fine snow particles against a surface of the curved tubular member for the agglomerating of the fine snow particles, the tubular member having an open end.

3. The device of claim 1 wherein a holder body contains the expansion member between opposed surfaces.

4. The device of claim 1 wherein the holder body forms a lip adjacent said supply conduit for directing pressurized gas through the expansion member.

5. The device of claim 1 wherein the plurality of channels have an average length of at least five times average channel diameter.

6. The device of claim 1 wherein the plurality of channels have an average diameter of about 0.2 to 500 microns.

7. The device of claim 6 wherein said agglomeration chamber consists of a cylindrically shaped snow horn for discharging agglomerated snow particles and said snow horn has a diameter of at least three times the diameter of the supply conduit for producing a low velocity flow of the agglomerated snow particles.

8. A method for producing large snowflakes from pressurized fluid comprising the steps of:

(A) providing a supply of pressurized fluid via a supply conduit;

(B) sending the pressurized fluid to a low pressure chamber through a plurality of channels to create a mixture of fine snow particles and gas, the plurality of channels having an average diameter and an average length of at least twice its average diameter; and (C) agglomerating the fine snow particles into the snowflakes in an agglomeration chamber which consists of (i) a cylindrically shaped snow horn for discharging agglomerated snow particles, said snow horn having a diameter of at least three times the diameter of the supply conduit or (ii) a curved tubular member for directing the fine snow particles against a surface of the curved tubular member for the agglomerating of the fine snow particles, the tubular member having an open end.

9. The method of claim 1 wherein the agglomerating forms snowflakes of sufficient size to prevent immediate sublimation upon contact with a room temperature item.

10. The method of claim 9 wherein the agglomerating forms the snowflakes with an average maximum dimension of at least about 0.5 mm.

11. The method of claim 8 wherein liquid carbon dioxide travels through the plurality of channels to form carbon dioxide snowflakes and carbon dioxide gas.

12. The method of claim 8 wherein the low pressure chamber forms a collimated stream of the fine snow particles and the agglomerating combines the fine snow particles from the collimated stream into the snowflakes.

13. The method of claim 8 wherein the plurality of channels have an average length of at least five time average diameter.

14. The method of claim 8 wherein said tubular member curves at least about ninety degrees and including the additional step of directing the snow at least about ninety degrees with said curved tubular member.

15. The method of claim 8 including the additional step of applying the snowflakes to chill a food item.

16. The method of claim 8 including the additional step of applying the snow flakes to freeze a food item.

17. The method of claim 8 wherein said agglomeration chamber consists of a cylindrically shaped snow horn for discharging agglomerated snow particles, said snow horn having a diameter of at least three times the diameter of the supply conduit.

18. The method of claim 8 wherein said agglomeration chamber consists of a curved tubular member for directing the fine snow particles against a surface of the curved tubular member for the agglomerating of the fine snow particles, the tubular member having an open end.

* * * * *